(12) United States Patent
Choi (10) Patent No.: US 8,390,747 B2
(45) Date of Patent: *Mar. 5, 2013

(54) ELECTRONIC DEVICE IN WHICH AN ELECTRONIC COMPONENT IS MOUNTED ON A MAIN BOARD

(75) Inventor: Young-ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,698

(22) Filed: Mar. 15, 2012

(65) Prior Publication Data

US 2012/0176757 A1 Jul. 12, 2012

Related U.S. Application Data

(63) Continuation of application No. 12/356,732, filed on Jan. 21, 2009, now Pat. No. 8,149,340.

(30) Foreign Application Priority Data

Jul. 25, 2008 (KR) .................. 10-2008-0072786

(51) Int. Cl.
*H04N 5/64* (2006.01)
(52) U.S. Cl. ........... 348/836; 348/794; 345/205; 349/58
(58) Field of Classification Search .......... 348/836–843, 348/794, 797; 361/749; 345/20, 55, 76, 345/82, 87, 98–100, 205, 206, 704; 349/58, 349/149–150
See application file for complete search history.

(56) References Cited

U.S. PATENT DOCUMENTS

| | | | |
|---|---|---|---|
| 6,115,259 | A | 9/2000 | Karner |
| 7,088,400 | B2 | 8/2006 | Lee et al. |
| 7,525,602 | B2 | 4/2009 | Yamamoto |
| 2005/0088577 | A1 | 4/2005 | Takahashi |
| 2005/0162242 | A1 | 7/2005 | Ootori et al. |

FOREIGN PATENT DOCUMENTS

KR 10-2007-0060019 A 6/2007

OTHER PUBLICATIONS

Non-Final Office Action, dated Jul. 8, 2011 in Parent U.S. Appl. No. 12/356,732.
Notice of Allowance, dated Nov. 30, 2011 in Parent U.S. Appl. No. 12/356,732.

*Primary Examiner* — Brian Glessner
*Assistant Examiner* — Adam Barlow
(74) *Attorney, Agent, or Firm* — Sughrue Mion, PLLC (57) ABSTRACT

There is provided an electronic device. The electronic device includes: a main board formed with a cut out and comprising first and second surfaces facing each other; and an electronic component comprising a sub board and a casing and connected to the main board. A part of the electronic component is accommodated in the cut out of the main board across the first and second surfaces of the main board. The sub board and the main board are spaced from each other without overlap.

10 Claims, 9 Drawing Sheets

ELECTRONIC DEVICE IN WHICH AN ELECTRONIC COMPONENT IS MOUNTED ON A MAIN BOARD

CROSS-REFERENCE TO RELATED APPLICATION

This is a Continuation Application of application Ser. No. 12/356,732, filed Jan. 21, 2009, which claims priority from Korean Patent Application No. 10-2008-0072786, filed on Jul. 25, 2008 in the Korean Intellectual Property Office, the entire contents of which are incorporated herein by reference.

BACKGROUND OF INVENTION

1. Field of Invention

Devices consistent with the present invention relate to an electronic device, and more particularly, to an electronic device in which an electronic component is mounted on a main board.

2. Description of Related Art

Recently, an electronic device such as a television tends to be slimmed. However, such an electronic device typically has a variety of boards and a plurality of electronic components mounted on the boards, which causes a limit to slimming.

SUMMARY OF INVENTION

The present invention provides an electronic device including: a main board formed with a cut out, and first and second surfaces that face in opposite directions; and an electronic component including a sub board and a casing that are connected to the main board wherein part of the electronic component is accommodated in the cut out of the main board across the first and second surfaces of the main board, and the sub board and the main board being spaced from each other without overlap.

The casing may include: a first casing accommodating the sub board; and a second casing extending from the first casing, the second casing being coupled to the main board.

The first casing may be spaced from the main board.

The main board may be formed with a thru hole adjacent to the cut out, and the second casing may include: an extending part connected to the first casing and extending in parallel to the first surface of the main board; and a bent part bent from the extending part towards the main board and inserting into the thru hole.

At least a part of the first casing and the second casing may be integrally formed.

The first casing may have a flat box shape, and the electronic component may be accommodated in the cut out so that a thickness of the first casing crosses the first and second surfaces of the main board.

The first casing may include: side casing members integrally formed with each other and surrounding four sides of the sub board; and top and bottom casing members each covering top and bottom surfaces of the sub board.

The second casing may be formed integrally with the side casing members of the first casing.

The electronic component may further include a jack protruding from the first casing.

The first casing may have an elongated shape, the jack may be protruded from a planar surface of the first casing in a thickness direction of the first casing, and the second casing may extend in a lengthwise direction of the first casing at each corner part of the first casing.

The first casing may have an elongated shape, the jack may be protruded from a short side wall of the first casing in a lengthwise direction of the first casing, and the second casing may extend in a widthwise direction of the first casing at each corner of the first casing.

The first casing may have an elongated shape, the jack may be protruded from a short side wall of the first casing in a lengthwise direction of the first casing, and the cut out may be formed at a side edge of the main board.

The electronic device may further include: a display panel; and front and rear casings accommodating the display panel. Here, the main board may be positioned between the display panel and the rear casing, and the electronic component may include a tuner.

A part of the jack may be exposed outside of the rear casing.

The present invention also provides an electronic device including: a front casing; a rear casing coupled with the front casing; a display panel positioned between the front casing and the rear casing; a main board positioned between the display panel and the rear casing and formed with a cut out; and a tuner coupled to the main board and comprising a sub board and a casing. Here, the casing of the tuner may include: a first casing positioned in the cut out and surrounding the sub board; and a second casing extending from the first casing and coupled to the main board.

The main board may include first and second surfaces facing each other, the first casing being accommodated in the cut out across the first and second surfaces of the main board.

The sub board and the main board may be spaced from each other without overlap.

The main board may be formed with a thru hole, and at least a part of the second casing may be inserted into the thru hole of the main board.

The second casing may include: an extending part extending from the first casing in parallel to a planar surface of the main board; and a bent part bent from the extending part towards the main board and inserting into the thru hole of the main board.

The tuner may further include a jack protruding from the first casing, a part of the jack being exposed outside of the rear casing.

BRIEF DESCRIPTION OF DRAWINGS

The present invention will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Repetitive description with respect to like elements of different embodiments may be omitted for the convenience of clarity.

Hereinafter, a television and a tuner are exemplified as an electronic device and an electronic component, respectively, but the present invention may be applied to any other electronic device having a configuration in which an electronic component is mounted to a main board.

An electronic device according to a first exemplary embodiment of the present invention will be described with reference to FIGS. 1 through 6.

Figure 1:
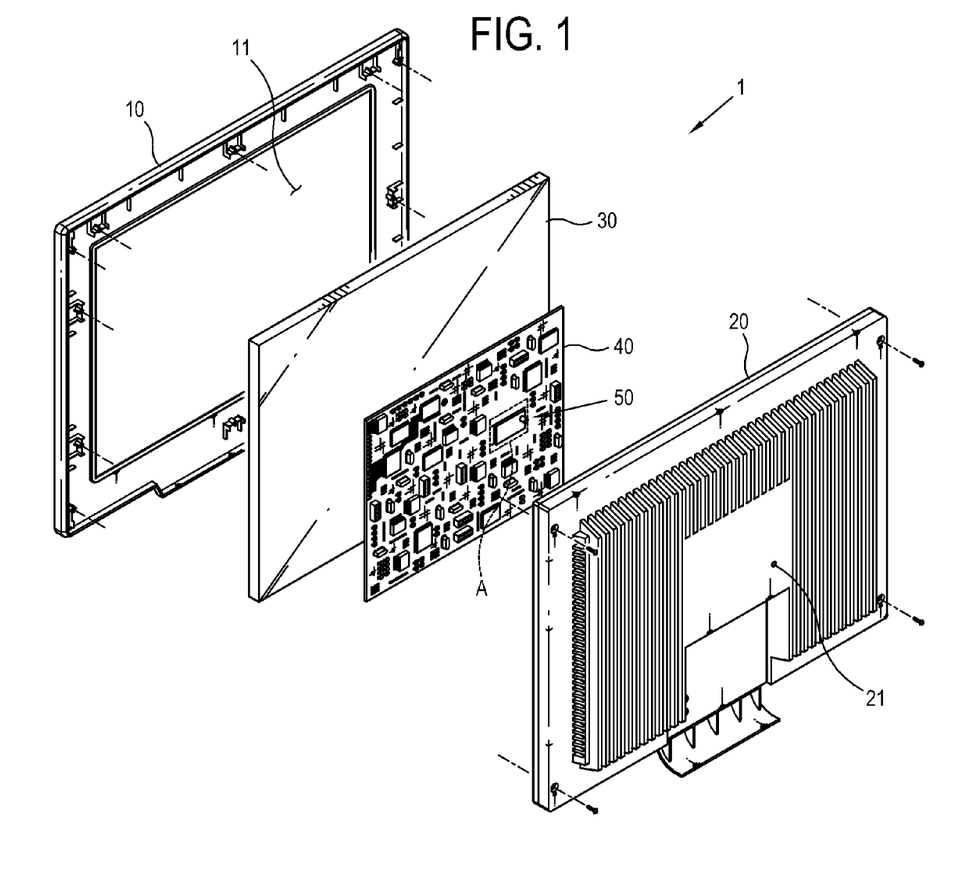
FIG. 1 is an exploded perspective view illustrating an electronic device according to a first exemplary embodiment of the present invention.

Referring to FIG. 1, a television 1 includes a front casing 10, a rear casing 20, a display panel 30, a main board 40 and a tuner 50. Although not shown, the television 1 may further include a support contacting an installation surface such as a wall or a floor. The support may be integrally formed with the casings 10 and 20.

Between the front casing 10 and the rear casing 20, which are assembled to each other, accommodated the display panel 30, the main board 40, and the tuner 50. The front casing 10 is formed with an opening 11, through which a front surface part of the display panel 30 is exposed outside. The rear casing 20 is formed with an exposure hole 21, through which a part of the tuner 50 is exposed outside.

The display panel 30 has a flat panel shape and provides a display screen. The display panel 30 may include a PDP (plasma display panel), an LCD (liquid display panel), an OLED (organic light emitting diode panel), or the like. In the case of the LCD, the display panel 30 includes a back light unit.

The main board 40 also has a flat panel shape and is smaller in size than the display panel 30. The main board 40 is mounted with various electronic components such as the tuner 50. The main board 40 receives a video signal from the outside, processes the video signal, and provides the processed video signal to the display panel 30.

The tuner 50 is mounted on the main board 40, and a part thereof is exposed to the outside through the exposure hole 21, as described above.

Figure 2:
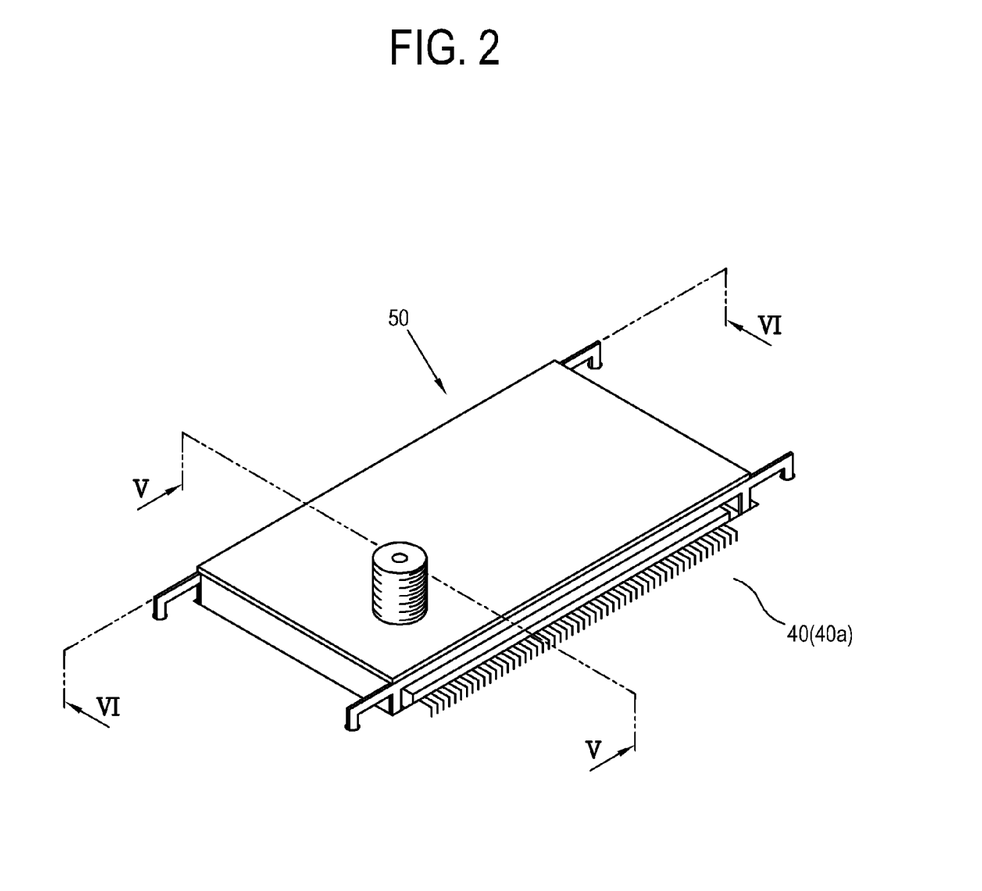
FIG. 2 is an enlarged view of an 'A' part in FIG. 1.

FIG. 2 is an enlarged view of an 'A' part in FIG. 1. The main board 40 is formed with a cut out 41 (see FIG. 3). The cut out 41 may have an elongated rectangular shape. A part of the tuner 50 is positioned inside the cut out 41, and another part of the tuner 50 is connected to the main board 40 around the cut out 41.

Figure 3:
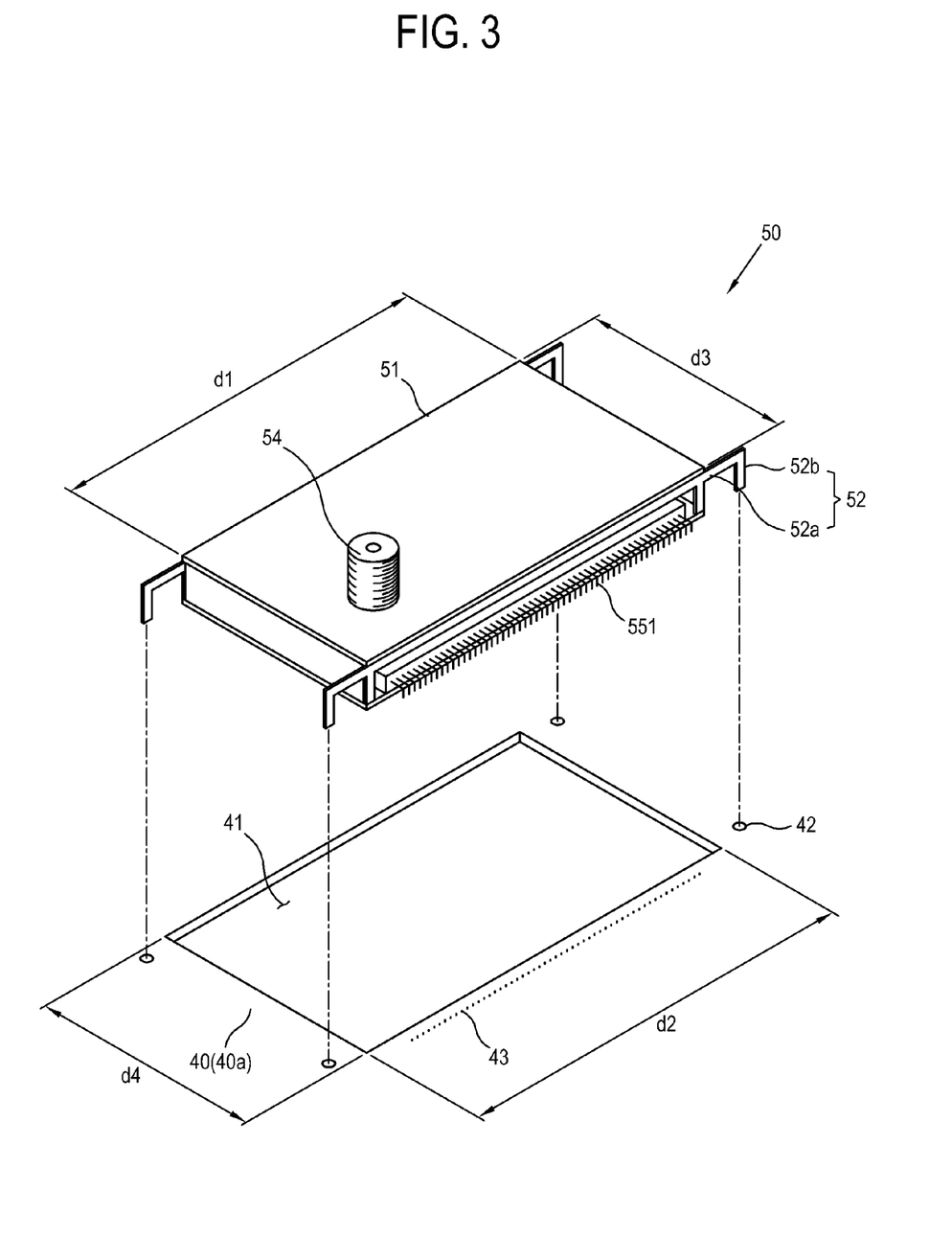
FIG. 3 is an exploded perspective view of the 'A' part in FIG. 2.

The main board 40 and the tuner 50 will be described in more detail referring to FIG. 3.

The main board 40 has a first surface 40a facing the rear casing 20 and a second surface 40b (see FIG. 5) facing the display panel 30. The main board 40 is formed with a plurality of, for example, four thru holes 42 and a multiplicity of connection pin pads 43 around the cut out 41.

The thru holes 42 are arranged adjacent to opposite short sides of the cut out 41, and the connection pin pads 43 are arranged adjacent to a long side of the cut out 41.

The tuner 50 includes a first casing 51, a second casing 52, a jack 54, and connection pins 551, which are all exposed to the outside of the tuner 50.

The first casing 51 has an elongated and flat rectangular box shape and is accommodated in the cut out 41. The first casing 51 has a length dl and a width d3 each shorter than a length d2 and a width d4 of the cut out 41.

The second casing 52 extends out of the first casing 51 in a lengthwise direction of the first casing 51. The second casing 52 includes an extending part 52a extending in parallel with a planar surface of the main board 40, and a bent part 52b bent from the extending part 52a towards the main board 40. The bent part 52b inserts into the thru holes 42 of the main board 40 to couple the tuner 50 to the main board 40.

The jack 54 is used for connection with an external element such as a cable and is protruded from the first casing 51 towards the rear casing 20.

The connection pins 551 are protruded outside from the lengthwise surface of the first casing 51. The connection pins 551 are electrically connected to the connection pin pads 43 of the main board 40, and transmit a video signal which is received from the outside by the tuner 50 to the main board 40.

Figure 4:
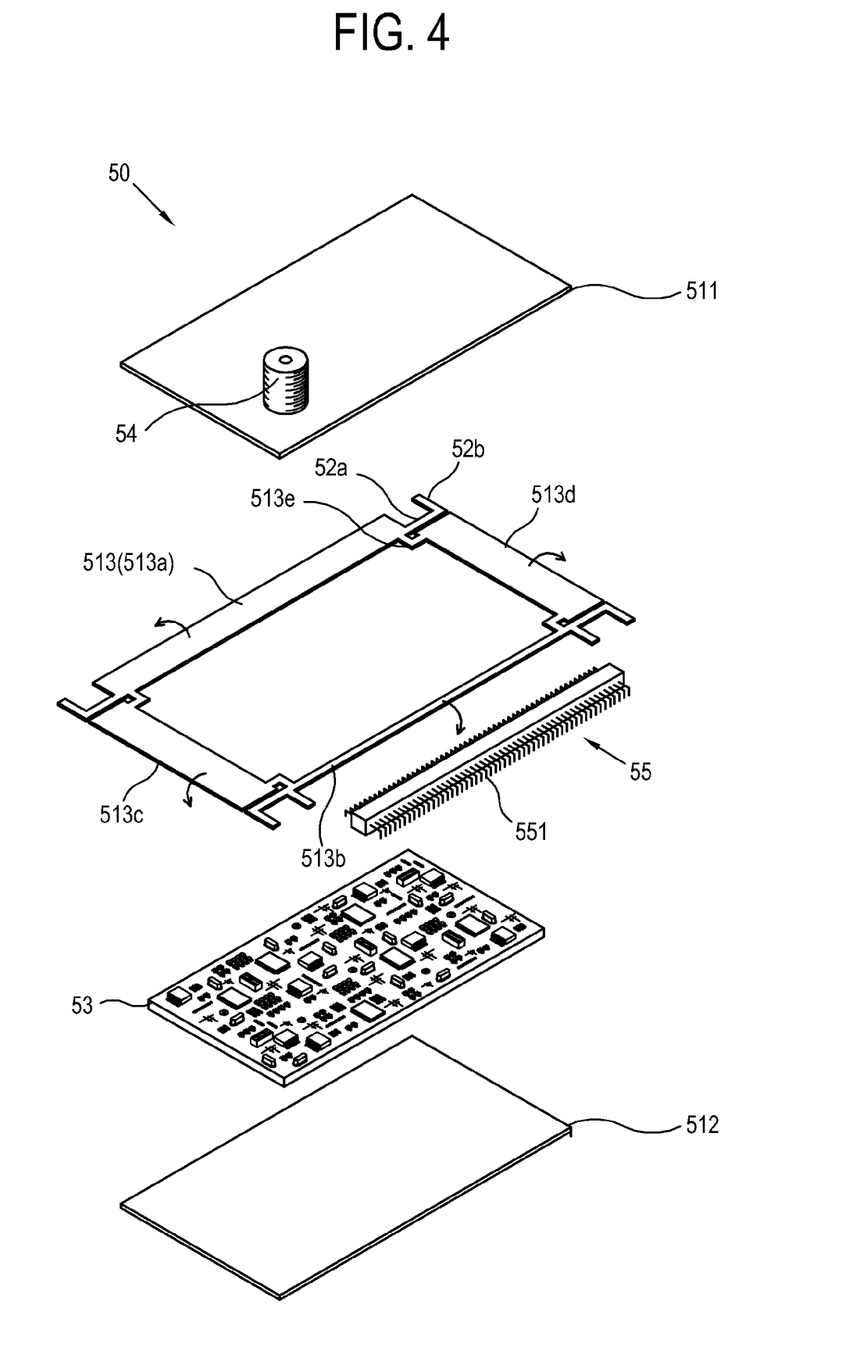
FIG. 4 is an exploded perspective view illustrating a tuner in the electronic device according to the first exemplary embodiment of the present invention.

Referring to FIG. 4, the tuner 50 includes the casings 51 and 52, a sub board 53, the jack 54 and a connection pin unit 55 including the connection pins 551. The casings 51 and 52, the jack 54 and the connection pins 551 have the configurations as described above. The connection pin unit 55 is electrically connected to the sub board 53 through the connection pins 551.

More specifically, the first casing 51 may be made of metal, and may interrupt electromagnetic waves generated in the sub board 53.

The first casing 51 includes a top casing member 511 facing the rear casing 20, a bottom casing member 512 opposite to the top casing 511 and facing the display panel 30, and side casing members 513a, 513b, 513c, 513d and 513e.

The top and bottom casing members 511 and 512 form a top surface and a bottom surface of the first casing 51, respectively, and the side casing members 513a through 513e form four side surfaces of the first casing 51, so as to accommodate the sub board 53 therein. The top and bottom casing members 511 and 512 are arranged approximately in parallel to the first and second surfaces 40a and 40b of the main board 40.

The first and second side casing members 513a and 513b are opposite to each other and extend in a lengthwise direction of the first casing 51. The second side casing member 513b has a configuration in which a part thereof is removed for connection of the connection pin unit 55, which is different in shape from the first side casing member 513a.

The third and fourth side casing members 513c and 513d are opposite to each other, and extends in a widthwise direction of the first casing 51. That is, the third and fourth side casing members 513c and 513d are shorter in length than the first and second side casing members 513a and 513b.

The connection casing member 513e connects the first to fourth side casing members 513a to 513d of the first casing 51 at four corners thereof. That is, the first to fourth side casing members 513a to 513d are integrally formed with each other by the connection casing member 513e.

The second casings 52 respectively extend from opposite end parts of the first and second side casing members 513a and 513b in a lengthwise direction of the first casing 51. In this respect, the first and second side casing members 513a and 513b are formed integrally with the second casings 52, respectively.

The side casing members 513a to 513e, which are in an unfolded state in FIG. 4 for an exemplary description, are in practice folded to form four side surfaces of the first casing 51. Here, the side casing members 513a to 513d are folded in arrow directions.

The sub board 53 has an approximately rectangular flat panel shape and is surrounded by the top and bottom casing members 511 and 512 and the side casing members 513a to 513e. The sub board 53 is arranged approximately in parallel with the top and bottom casing members 511 and 512.

In the above-described tuner 50, connection of the top and bottom casing members 511 and 512 and the side casing members 513a to 513e, connection of the sub board 53 and the first casing 51, connection of the connection pin unit 55 and the sub board 53, connection of the jack 54 and the top casing member 511, and connection of the jack 54 and the sub board 53 may be accomplished by various known methods by those skilled in the art.

According to the present embodiment, a distance between the display panel 30 and the rear casing 20 can be reduced, which will be described with reference to FIGS. 5 and 6.

The first casing 51 of the tuner 50 is accommodated in the cut out 41 of the main board 40, and the second casing 52 of the tuner 50 is fixedly coupled to the main board 40.

The first casing 51 is accommodated in the cut out 41 without contact with the main board 40, and thus, the sub board 53 is also spaced from the main board 40 so that the sub board 53 and the main board 40 do not overlap each other. The first casing 51 may contact the main board 40 according to another embodiment, but even in this case, the sub board 53 is spaced from the main board 40 without overlap.

Figure 5:
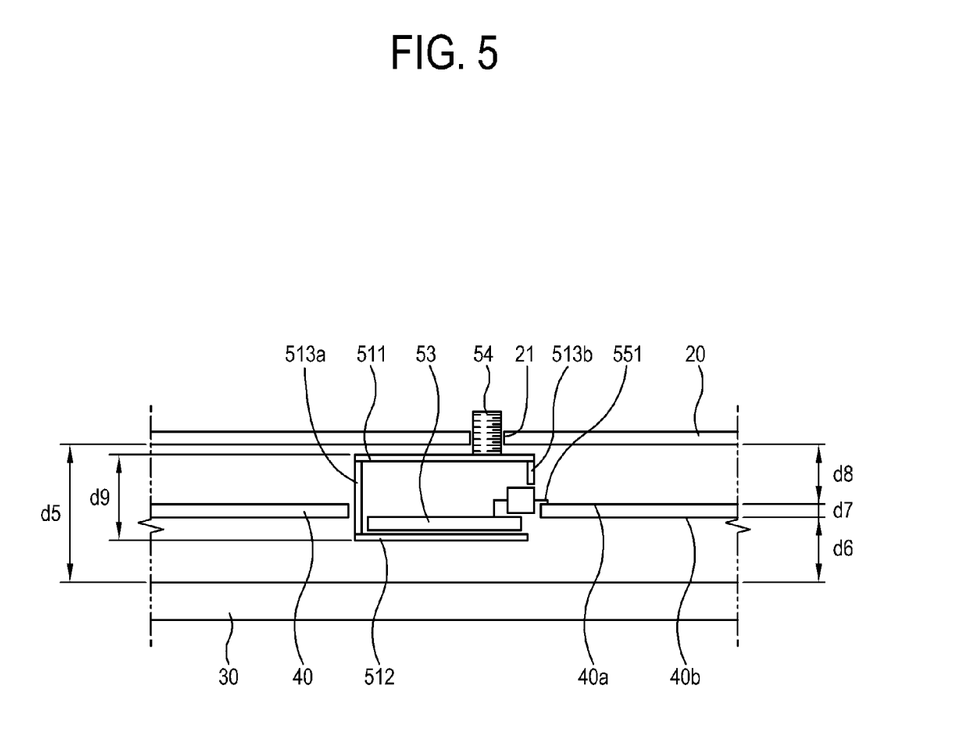
FIG. 5 is a section view taken along line V-V in FIG. 2.

As shown in FIG. 5, the first casing 51 of the tuner 50 is accommodated in the cut out 41 so that a thickness of the first casing 51 crosses the first and second surfaces 40a and 40b of the main board 40. That is, the top casing member 511 of the first casing 51 is positioned between the first surface 40a of the main board 40 and the rear casing 20 and the bottom casing member 512 thereof is positioned between the second surface 40b of the main board 40 and the display panel 30.

Figure 6:
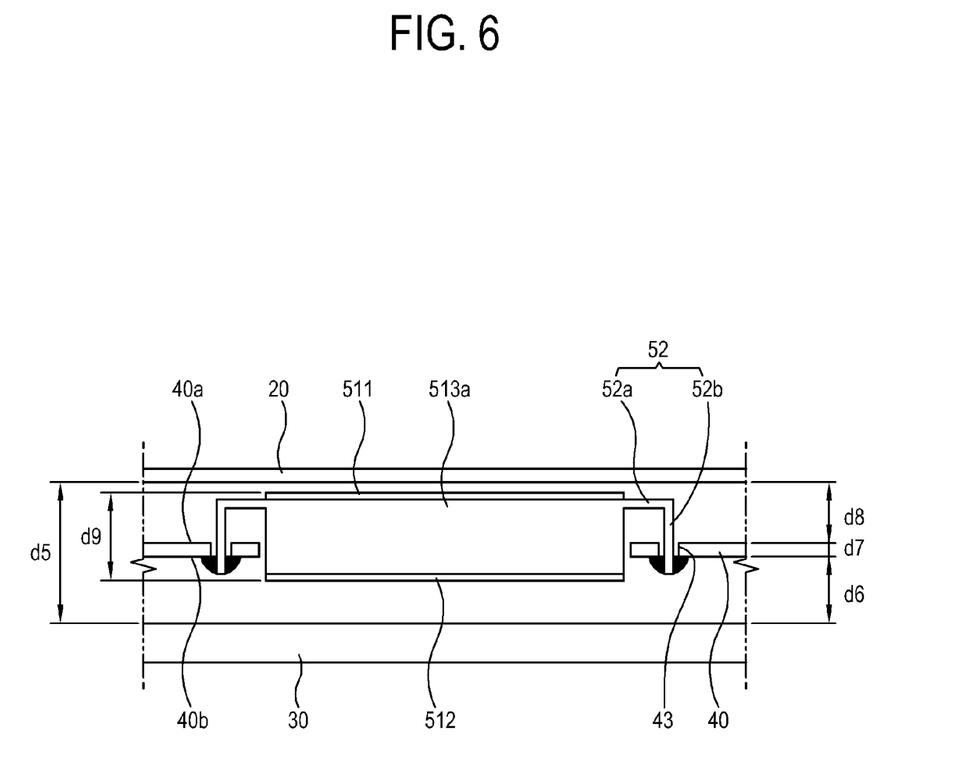
FIG. 6 is a section view taken along line VI-VI in FIG. 2.

As shown in FIG. 6, the bent parts 52b of the second casings 52 are inserted into the thru holes 42 of the main board 40 so that an end part of each bent part 52b is positioned between the main board 40 and the display panel 30. The end part of each bent part 52b and the second surface 40b of the main board 40 are connected by soldering to fixedly couple the tuner 50 to the main board 40.

A part of the jack 54 is, as shown in FIG. 5, exposed outside through the exposure hole 21 of the rear casing 20. A user may connect an external element such as a cable to the exposed jack 54. According to the present embodiment, the connection of the jack 54 and the cable is made in a thickness direction of the television 1.

Referring to FIG. 5, a distance d5 between the display panel 30 and the rear casing 20 is the sum of a distance d6 between the display panel 30 and the main board 40, a thickness d7 of the main board 40, and a distance d8 between the main board 40 and the rear casing 20.

The distance d6 between the display panel 30 and the main board 40 is difficult to reduce below a certain value due to thicknesses of electronic components (not shown) mounted on the main board 40. Further, the thickness d7 of the main board 40 is difficult to reduce below a certain value. Also, a thickness d9 of the first casing is difficult to reduce below a certain value.

However, according to the present embodiment, since the first casing 51 is accommodated in the cut out 41 of the main board 40, a part of the thickness d9 of the first casing 51 overlaps with the distance d6 between the main board 40 and the display panel 30. Thus, the distance d8 between the main board 40 and the rear casing 20 for accommodating the first casing 51 can be reduced, and accordingly, the distance d5 between the display panel 30 and the rear casing 20 can be also reduced.

With respect to the first exemplary embodiment of the present invention, various modifications may be provided. For example, the second casing 52 of the tuner 50 may be separately provided and then coupled to the first casing 51, and may extend from the top and bottom casing members 511 and 512. Further, the second casing 52 may be coupled to the first surface 40a by soldering without (passing through) the thru holes 42.

Figure 7:
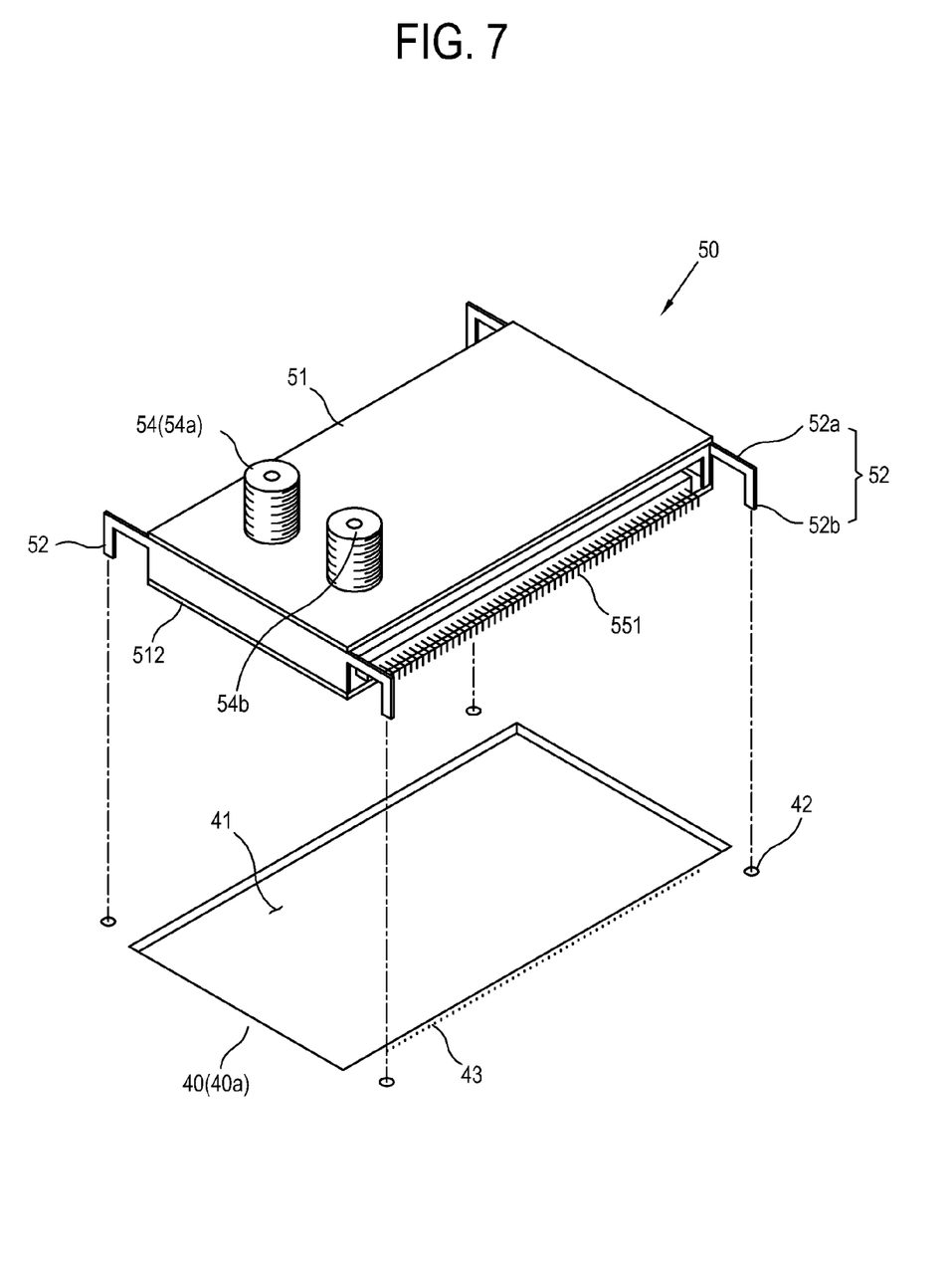
FIG. 7 is an exploded perspective view illustrating a main part of an electronic device according to a second exemplary embodiment of the present invention.
Figure 8:
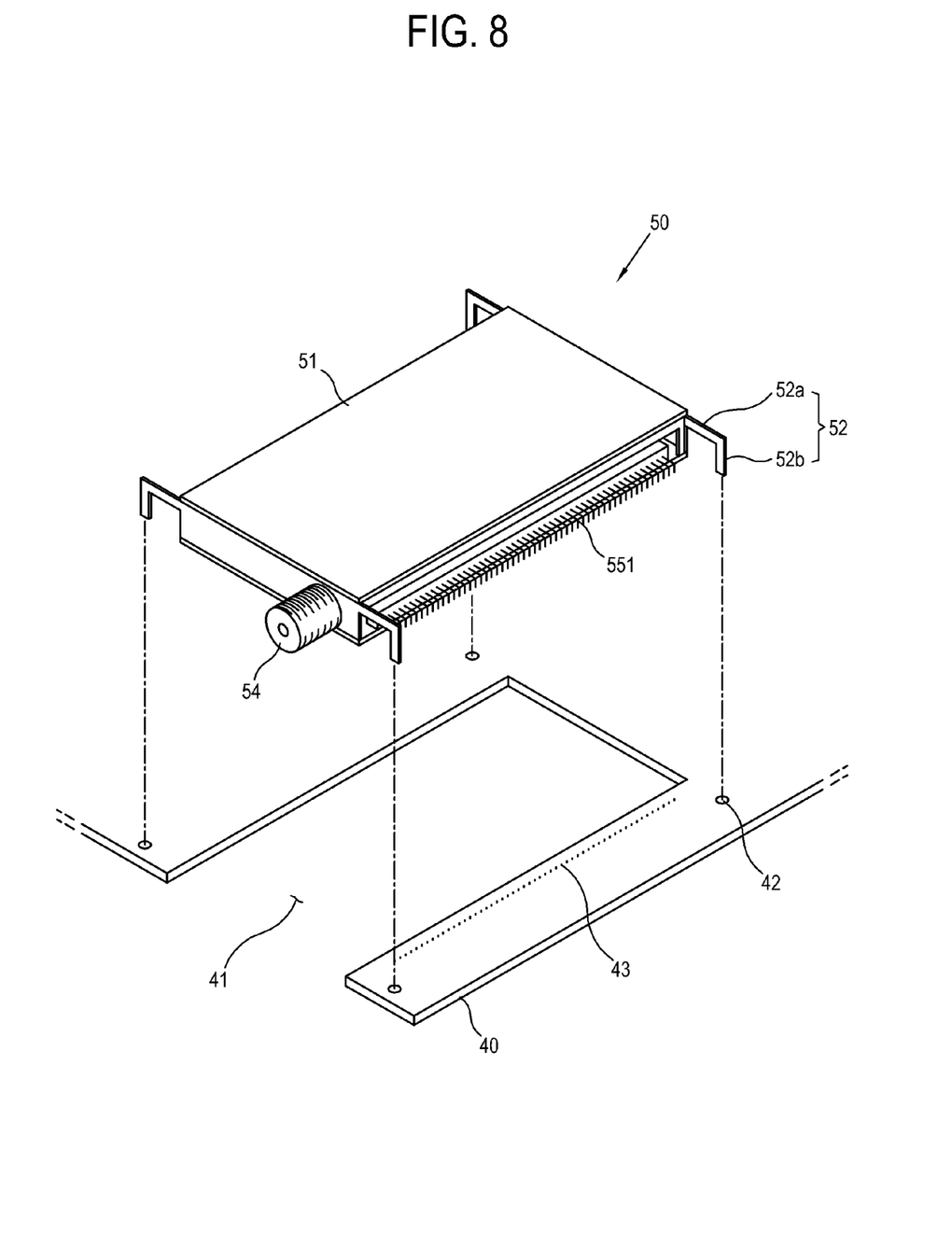
FIG. 8 is an exploded perspective view illustrating a main part of an electronic device according to a third exemplary embodiment of the present invention.
Figure 9:
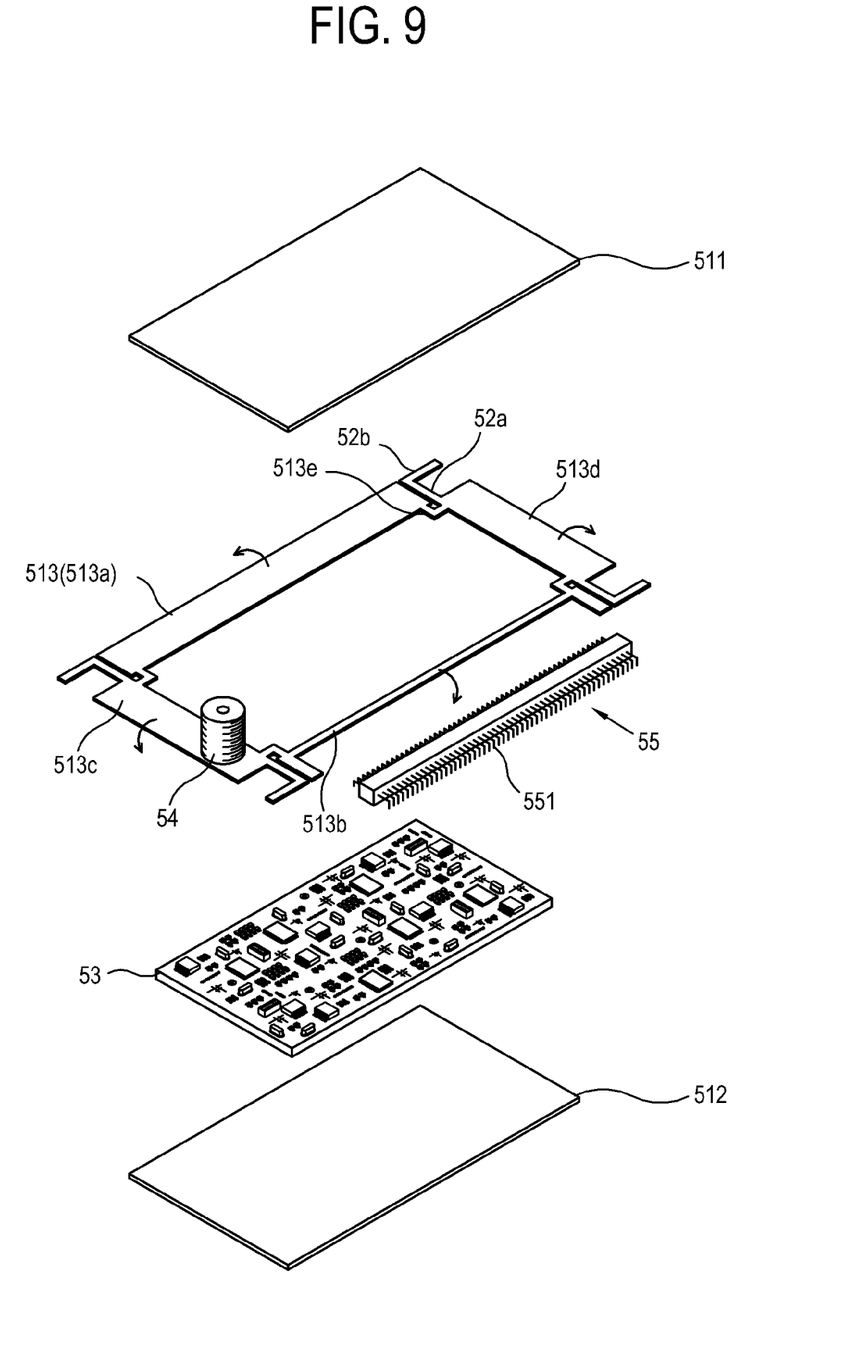
FIG. 9 is an exploded perspective view illustrating a tuner in the electronic device according to the third exemplary embodiment of the present invention.

The position and number of the jack 54 may be varied according to different specifications of television models or different regulations of countries, which will be described with reference to second and third exemplary embodiments of the present invention.

The second exemplary embodiment of the present invention will be described referring to FIG. 7.

The second embodiment is different from the first embodiment in that the jack 54 is provided in a pair 54a and 54b, which protrudes towards the rear casing 20, the second casing 52 of the tuner 50 extends in a widthwise direction of the first casing 51. The distance d5 between the display panel 30 and the rear casing 20 may be reduced in the same way as in the first embodiment.

The third exemplary embodiment of the present invention will be described referring to FIGS. 8 and 9.

According to the third embodiment, the second casings 52 of the tuner 50 respectively extend in a widthwise direction of the first casing 51, from opposite end parts of the third and fourth side casing members 513c and 513d, like the second embodiment. The thru holes 42 of the main board 40 are arranged adjacent to opposite long sides of the cut out 41 to correspond to the second casings 52.

Further, the jack 54 is protruded from the third side casing member 513c in a lengthwise direction of the first casing 51, unlike the first and second embodiments.

Furthermore, the cut out 41 of the main board 40 is provided at a side edge of the main board 40, so that the jack 54 can be exposed through a side wall of the television 1. In this case, connection of the jack 54 and a cable is made in a perpendicular direction to the connection thereof in the first and second embodiments.

The distance d5 between the display panel 30 and the rear casing 20 may be also reduced in the same way as in the first embodiment.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An electronic device comprising:
   a main board formed with a thru hole and a cut out, wherein the cut out is adjacent to the thru hole, and wherein the main board comprises a first surface and a second surface facing in opposite directions; and
   an electronic component comprising at least one connection pin,
   wherein a part of the electronic component is accommodated in the cut out of the main board across the first and the second surfaces of the main board,
   wherein the at least one connection pin is inserted into the thru hole, thereby the electronic component is coupled to the main board.

2. The electronic device according to claim 1, wherein the electronic component further comprises a supporter to support the electronic component, and the at least one connection pin extends from the supporter toward the thru hole.

3. The electronic device according to claim 2, wherein the supporter and the at least one connection pin are integrally formed.

4. The electronic device according to claim 3, further comprising: a display panel; and a front casing and a rear casing accommodating the display panel, wherein the main board is positioned between the display panel and the rear casing.

5. An electronic device comprising:
a front casing;
a rear casing coupled with the front casing;
a display panel positioned between the front casing and the rear casing;
a main board positioned between the display panel and the rear casing and formed with a cut out and a thru hole adjacent to the cut out; and
an electronic component comprising at least one connection pin,
wherein a part of the electronic component is accommodated in the cut out of the main board,
wherein at least one connection pin is inserted into the thru hole, thereby the electronic component is coupled to the main board.

6. The electronic device according to claim 5, wherein the electronic component is accommodated in the cut out of the main board, such that a upper part of the electronic component protrudes from the first surface and a lower part of the electronic component protrudes from the second surface.

7. The electronic device according to claim 5, wherein the electronic component further comprises a supporter to support the electronic component, and the at least one connection pin extends from the supporter toward the thru hole.

8. The electronic device according to claim 7, wherein the supporter and the at least one connection pin are integrally formed.

9. The electronic device according to claim 2, wherein the at least one connection pin is electrically connected to at least one connection pin pad of the main board around the cut out, and the supporter has at least one bent part inserted into at least one other thru-hole.

10. The electronic device according to claim 7, wherein the at least one connection pin is electrically connected to at least one connection pin pad of the main board around the cut out, and the supporter has at least one bent part inserted into at least one other thru-hole.

* * * * *